(12) United States Patent
Kaneshiro et al.

(10) Patent No.: US 8,071,501 B2
(45) Date of Patent: *Dec. 6, 2011

(54) COMPOSITE OXIDE FOR USE AS EXHAUST GAS PURIFICATION CATALYST AND FILTER

(75) Inventors: Yuki Kaneshiro, Okayama (JP); Akira Nagatomi, Honjo (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 144 days.

This patent is subject to a terminal disclaimer.

(21) Appl. No.: 12/312,034

(22) PCT Filed: Oct. 10, 2007

(86) PCT No.: PCT/JP2007/070212
§ 371 (c)(1),
(2), (4) Date: Apr. 23, 2009

(87) PCT Pub. No.: WO2008/050642
PCT Pub. Date: May 2, 2008

(65) Prior Publication Data
US 2010/0111778 A1     May 6, 2010

(30) Foreign Application Priority Data
Oct. 24, 2006  (JP) .................... 2006-288242

(51) Int. Cl.
*B01J 23/00* (2006.01)
*B01J 23/10* (2006.01)
(52) U.S. Cl. ......... 502/304; 502/302; 502/325; 502/353

(58) Field of Classification Search .......... 502/302–304, 502/325, 339, 349, 353–354
See application file for complete search history.

(56) References Cited

U.S. PATENT DOCUMENTS

| | | | |
|---|---|---|---|
| 3,857,899 A * | 12/1974 | Tasaka et al. | 568/804 |
| 6,583,316 B1 * | 6/2003 | Onodera et al. | 562/537 |
| 6,585,944 B1 * | 7/2003 | Nunan et al. | 423/239.1 |
| 7,365,041 B2 * | 4/2008 | Miyaki et al. | 502/311 |
| 2004/0248734 A1 * | 12/2004 | Miyaki et al. | 502/311 |
| 2005/0282698 A1 * | 12/2005 | Southward et al. | 502/34 |

FOREIGN PATENT DOCUMENTS
JP   6-211525   8/1994
(Continued)

OTHER PUBLICATIONS

Z.C. Kang et al., "Lattice Oxygen Transfer in Fluorite-Type Oxides Containing Ce, Pr, and/or Tb" (2000) *Journal of Solid State Chemistry*, vol. 155 pp. 129-137.

*Primary Examiner* — Stanley Silverman
*Assistant Examiner* — Anthony J Zimmer
(74) *Attorney, Agent, or Firm* — Clark & Brody

(57) ABSTRACT

A composite oxide for exhaust gas purification catalysts, which comprises Ce, Bi, R and oxygen and satisfies $0<x\leq 0.4$ and $0<y<1.0$ when the molar ratio of Ce, Bi and R of the oxide is represented as $(1-x-y)$, x and Y respectively. The composite oxide has an X-ray diffraction peak corresponding to that of a fluorite structure. In the composite oxide, R contains one or two of Pr and Tb. The exhaust gas purification catalyst is favorable for a PM combustion catalyst.

4 Claims, 1 Drawing Sheet

FOREIGN PATENT DOCUMENTS

| | | |
|---|---|---|
| JP | 6-279027 | 10/1994 |
| JP | 2003-238159 | 8/2003 |
| JP | 2004-113936 | 4/2004 |
| JP | 2005-162914 | 6/2005 |
| JP | 2005-521617 | 7/2005 |
| JP | 2006-159021 | 6/2006 |
| JP | 2006-224032 | 8/2006 |
| WO | 2005/085137 | 9/2005 |

* cited by examiner

COMPOSITE OXIDE FOR USE AS EXHAUST GAS PURIFICATION CATALYST AND FILTER

TECHNICAL FIELD

The present invention relates to a composite oxide (oxide comprising plural kinds of elements and oxygen) suitable for combustion of PM (particulate matter) that is discharged from diesel engines of automobiles and others and to an exhaust gas purification catalyst using the oxide and a diesel exhaust gas purification filter comprising the oxide.

BACKGROUND ART

A problem with diesel engine exhaust gas includes nitrogen oxide (NOx) and PM. Above all, PM is a fine particulate mainly comprising carbon, and as a general method for removing it, there is mentioned a method for trapping PM by disposing a diesel particulate filter (DPF) that comprises a porous ceramic material, in an exhaust gas duct. The trapped PM is intermittently or continuously processed for combustion, and the DPF is regenerated to its state before PM trapping.

For the DPF regeneration treatment, generally employed are a method of combusting PM by forced heating from the outside with an electric heater, a burner or the like; a method comprising disposing an oxidation catalyst on the side nearer to engine than DPF and converting NO in exhaust gas into $NO_2$ with the oxidation catalyst to thereby burn PM by the oxidation force of $NO_2$; etc. However, use of an electric heater or a burner requires installation of an external power source for it, further requiring an additional mechanism or the like for maintaining and operating them; and therefore, the system itself shall be complicated. In addition, the oxidation catalyst has some problems to be solved in that the exhaust gas temperature is not so high to such a degree that the catalyst could sufficiently exhibit its catalytic activity, and the exhaust gas could not contain NO necessary for PM combustion unless it is not under a certain driving condition. As a more preferred regeneration treatment method for DPF, a method is being investigated, which comprises making DPF itself carry a catalyst to thereby lower the PM combustion starting temperature by the catalytic action, followed by PM combustion. As an ultimate object, a method of continuous combustion at an exhaust gas temperature is considered the best.

At present, as an oxidation catalyst for combustion and removal of PM trapped by DPF (PM combustion catalyst), used is a catalyst metal Pt supported by alumina or the like having a high specific surface area. However, on an exhaust gas temperature level, the catalytic effect action of Pt for PM combustion is low, and therefore, continuous PM combustion with the heat of exhaust gas is considered difficult. In addition, another problem is that Pt is expensive and causes cost increase.

Still another assumed problem with a PM combustion catalyst is that the catalyst temperature may rapidly increase owing to the heat generation in PM combustion. Accordingly, expected is development of catalyst substances of which the catalyst capability in exposure to a thermal history at high temperatures degrades as little as possible (that is, those resistant to thermal deterioration). Patent References 1 to 3 disclose, as an oxidation catalyst based with a ceria composite oxide not containing a noble metal element such as Pt or the like, a mixture containing Ce and Bi alone, or further containing a transition metal element. The oxide solid solution comprising Ce and Bi alone, or comprising Ce, Bi and a transition metal element releases Bi when exposed to a high temperature of around 800° C. for a long period of time, since the melting point of the element Bi is low, and therefore, the catalyst activity lowers. Accordingly, further improvement of the catalyst in point of the heat resistance thereof is desired.

Patent Reference 1: JP-A 6-211525
Patent Reference 2: JP-A 2003-238159
Patent Reference 3: JP-A 2006-224032

Problems that the Invention is to Solve

In consideration of the current situation as above, the present invention is to provide an oxidation catalyst substance capable of combusting PM in diesel engine exhaust gas at a low temperature and degrading little by the heat in PM combustion (that is, having good heat resistance).

Means for Solving the Problems

As a result of assiduous studies, the present inventors have found that the above object can be attained by a composite oxide comprising Ce, Bi, R or further Zr, and oxygen. In this, R is at least one lanthanoid except La and Ce (the same shall apply to the expression R hereinunder). The lanthanoid except La and Ce is an element having an atomic number of from 59 to 71.

Concretely, the invention provides a composite oxide for exhaust gas purification catalysts, which comprises Ce, Bi, R and oxygen and satisfies $0 < x \leq 0.4$ and $0 < y < 1.0$ when the molar ratio of Ce, Bi and R of the oxide is represented as $(1-x-y)$, x and Y respectively. For one that contains Zr, the invention also provides a composite oxide for exhaust gas purification catalysts, which comprises Ce, Bi, R, Zr and oxygen and satisfies $0 < x \leq 0.4$, $0 < y < 1.0$ and $0 < z \leq 0.5$ when the molar ratio of Ce, Bi, R and Zr of the oxide is represented as $(1-x-y-z)$, x, y, and z respectively. As the R, it includes one or two of Pr and Tb. The composite oxide has an X-ray diffraction peak corresponding to that of a fluorite structure. As the composite oxide of the invention, employable are those containing a platinum group element. The platinum group element includes Pt, Rh, Pd, Ir, Ru and Os; and one or more of these are employable. Regarding the morphology of the platinum group element existing therein, the platinum group element may adhere to the surface of the composite oxide particles, or the platinum group element may exist as a solid solution in the crystal structure of the composite oxide. The exhaust gas purification catalyst comprising the composite oxide of the invention is favorable for a PM combustion catalyst.

The exhaust gas purification catalyst comprising the composite oxide of the invention may contain the composite oxide of the invention alone as a catalyst substance, but may contain the composite oxide of the invention as mixed with any other substance such as $Al_2O_3$, $TiO_2$, $SiO_2$ or the like.

The invention also provides a porous filter for trapping PM in diesel engine exhaust gas suitable to be used for diesel exhaust gas purification, wherein the porous site to be contacted with the trapped PM comprises the above-mentioned composite oxide.

The composite oxide for exhaust gas purification catalysts of the invention has the ability to lower a PM self-ignition starting temperature, as compared with conventional Ce-based composite oxides, and therefore it may lower the combustion temperature of PM. Accordingly, the heat to be given to DPF can be retarded, and this brings about load reduction in various exhaust gas line members. It further enables compactness of thermal energy application devices.

Of the composite oxide for exhaust gas purification catalysts of the invention, even when the oxidation catalyst is exposed to long-term high-temperature thermal history by ignition during PM combustion, its thermal degradation is small, as compared with that of conventional Ce-based composite oxides. Accordingly, the catalyst of the invention can maintain its excellent catalytic activity for a long period of time.

In addition, even when an expensive noble metal element is not used, the catalyst may have a high catalytic activity, and in this case, the material cost for DPF may be reduced. On the other hand, in case where a platinum group element is added to the catalyst, further increase in the catalytic activity can be expected.

Accordingly, the invention contributes toward life prolongation of an exhaust gas purification mechanism with DPF and toward total cost reduction thereof.

PREFERRED EMBODIMENT OF THE INVENTION

Figure 1:
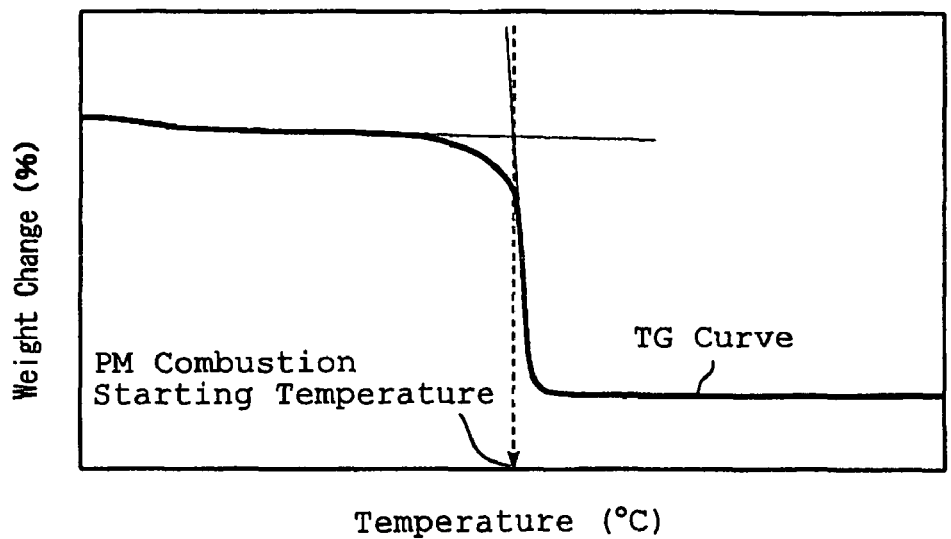
FIG. 1 is a view graphically showing a TG curve.

The invention provides, as a catalyst substance, a composite oxide that comprises mainly Ce, Bi, R (where R is at least one lanthanoid except La and Ce), and optionally further Zr. The present inventors' studies have revealed that the composite oxide to which the invention is directed has an oxide phase structure derived from a fluorite structure-having cerium oxide by substituting a part of Ce with Bi, R or Zr. Specifically, the composite oxide has an X-ray diffraction peak corresponding to that of a fluorite structure.

Regarding the molar ratio of the metal elements constituting the composite oxide, the invention is directed to preferred embodiments satisfying the following [a] or [b]. In [a], the metal elements are Ce, Bi and R; and in [b], the metal elements are Ce, Bi, R and Zr.

[a] $0<x\leq0.4$ and $0<y<1.0$ where the molar ratio of Ce, Bi and R is represented with $(1-x-y)$, x and y respectively.

[b] $0<x\leq0.4$, $0<y<1.0$ and $0<z\leq0.5$ where the molar ratio of Ce, Bi, R and Zr is represented with $(1-x-y)$, x, y and z respectively.

The composite oxide may contain Bi, R or Zr that does not substitute the Ce atom in a cerium oxide structure, as an impurity phase, but the presence of the impurity phase is allowable so far as it does not detract from the effect of the invention. In case where the composite oxide contains the impurity phase within an allowable range, the molar ratio of the constitutive elements is able to satisfy the above [a] or [b] as a whole of the composite oxide including Ce, Bi, R or Zr in the impurity phase.

The present inventors' studies have revealed that the Ce—Bi—R-based or Ce—Bi—R—Zr-based composite oxide where R is contained may exhibit a catalytic activity from a lower temperature range and, in particular, can have excellent heat resistance to high-temperature long-term heating, as compared with Ce—Bi-based composite oxides where the metal elements are Ce and Bi alone. The reason is not sufficiently clarified at present; however, it is considered that the basic catalytic activity mechanism may be the same as the mechanism heretofore taken into consideration for conventional Ce—Bi-based composite oxides. Specifically, it is considered that, in the Ce atom-based composite oxide, the cation may undergo apparent valence change and the Ce site may be substituted with an atom that differs from Ce in point of the ionic radius thereof, such as Bi, R or the like, thereby causing lattice strain and, as a result, oxygen in the lattice may come to be readily released out of the lattice and active oxygen necessary for oxidation may be thereby readily supplied from a relatively low temperature range. In addition, it may be considered that the substitution-caused lattice strain may stabilize the existence of the Bi atom in the crystal lattice and may be effective for preventing Bi from becoming free, and it may be presumed that the heat resistance of the composite oxide in high-temperature long-term maintenance may be thereby enhanced. It may be presumed that, in the composite oxide with R, to which the invention is directed, the above-mentioned substitution-caused effect may be enhanced more than that in the composite oxide comprising Ce and Bi alone, and therefore the catalytic activity and the heat resistance of the former composite oxide may be thereby enhanced more.

Bi is effective for enhancing the catalytic activity of a cerium oxide structure-having oxide in a low temperature range, or that is, for lowering the PM combustion starting temperature thereof. The mechanism is considered the same as that mentioned in the above. Even though the amount of Bi added is relatively small, this is still effective for enhancing the catalytic activity of the oxide in a low temperature range. However, it has been found that, in case where the amount of Bi added is too large, the effect could not increase any more but rather the catalyst substance may be melted when exposed to high temperatures. This may be considered because the addition of low-melting-point Bi may lower the melting point of the composite oxide. A suitable range of the amount of Bi to be added may be determined depending on the PM combustion starting temperature of the sample after exposure to a high temperature for a long period of time and the crystal structure change thereof. This is investigated based on the evaluation as above and, as a result, the blend ratio of Bi in the composite oxide is preferably within a range of $0<x\leq0.4$ as in the above [a] or [b]. When x is more than 0.4, the PM combustion starting temperature of the sample after exposure to a high temperature for a long period of time may be high. In this case, the Bi atom may separate from the fluorite structure to form a heterogeneous phase such as a Bi oxide or a composite oxide of Bi and an additive element; and if so, the composite oxide produced may contain an impurity phase in an amount that may detract from the effect of the invention.

In the invention, it is important to employ a novel composite oxide with R (at least one lanthanoid except La and Ce) added thereto as a third element. Even though the amount of R added is relatively small, this brings about an excellent heat resistance-enhancing effect. Even if the amount added is large, the heat resistance-enhancing effect is almost kept as such. Accordingly, the blend ratio of R is defined to fall within a range of $0<y<1.0$ as in the above [a] or [b]. However, when the blend ratio of R is large, the PM combustion starting temperature tends to rise, and therefore, more preferably, $0<y\leq0.5$.

As so mentioned above, R comprises a lanthanoid except La and Ce. Above all, preferably selected is a lanthanoid capable of forming an oxide that has a fluorite structure similar to cerium oxide ($CeO_2$). Partial Ce atom substitution with the element of the type may readily keep the fluorite structure, therefore giving an exhaust gas purification catalyst of much better heat resistance. The element of the type includes, for example, Pr and Tb. Preferably, one or two of Pr and Tb are added to the composite oxide as R; and more preferably, all R is composed of one or two of Pr and Tb. In particular, Pr is even more preferred as satisfying a good balance of PM combustion starting temperature depression and heat resistance enhancement.

Zr is effective for preventing the primary particles of the composite oxide from being sintered during baking, and is an element effective for increasing the specific surface area of the composite oxide. The increase in the specific surface area brings about enhancing the catalytic activity of the composite oxide. Accordingly, Zr addition is especially effective for furthermore lowering the PM combustion starting temperature after exposure to high-temperature long-term heating. However, excessive Zr addition may lose the fluorite structure. Accordingly, in case where Zr is added, it is preferably within a range of $0<z\leqq0.5$ as in the above [b], or as the case may be, the range may be limited to $0<z\leqq0.3$.

Also effectively, a platinum group element may be added to the composite oxide. The platinum group element is effective for promoting the oxidation of the fuel in exhaust gas and the un-combusted ingredients such as NO and CO therein. This is also expected to be effective for further lowering the PM combustion starting temperature. At least one of platinum group elements (Pt, Rh, Pd, Ir, Ru, Os) may be used; and in particular, Pt, Rh and Pd are more effective for enhancing the catalytic efficiency of the composite oxide. For example, the platinum group element may be incorporated in the composite oxide of the invention. Alternatively, the platinum group element may be added to a substance generally used as a catalyst carrier such as $Al_2O_3$, $TiO_2$ or $SiO_2$, and the substance may be mixed with the composite oxide of the invention, whereby the composite oxide of the invention may have the platinum group element as combined. Regarding the amount of the platinum group element to be added to the composite oxide of the invention, the content of the platinum group element in the composite oxide of the invention, or the content of the platinum group element in the mixture of the composite oxide of the invention and the catalyst carrier substance containing the platinum group element added thereto may be, for example, from 0.05 to 5% by mass.

As a method for evaluating the heat resistance of a PM combustion catalyst in exposure to high-temperature long-term thermal history, effectively employable is, for example, a method that comprises subjecting a composite oxide synthesized by baking, to high-temperature long-term heat treatment in air (hereinafter this is referred to as "heat resistance treatment"), followed by checking it as to whether and to what degree its catalytic activity to PM has changed between just after the baking and after the heat resistance treatment. The catalytic activity to PM may be evaluated, for example, based on the PM combustion starting temperature to be mentioned below. When a composite oxide is produced by baking under heat at 800° C. for 2 hours, the composite oxide before exposed to the above-mentioned heat resistance treatment has experienced the thermal history alone at 800° C. for 2 hours. Accordingly, the difference between the PM combustion starting temperature of the sample that is prepared by exposing the above sample having experienced the thermal history at 800° C. for 2 hours, to heat resistance treatment at 800° C. for 100 hours, and the PM combustion starting temperature of the sample before exposed to the heat resistance treatment is employed as the heat resistance index $\Delta T$ (° C.) in this description. Preferably, $\Delta T$ of a PM combustion catalyst is not higher than 12° C. from the practical viewpoint, more preferably $\Delta T$ thereof is not higher than 10° C.

The present inventors have synthesized composite oxides of various compositions containing Ce, Bi and a third element according to a method of baking at 800° C. for 2 hours, and have investigated the relationship between the oxide structure and the heat resistance index $\Delta T$ of the samples before and after the heat resistance test. As a result, some samples have shown a new heterogeneous phase after the above-mentioned heat resistance treatment at 800° C. for 100 hours even though a heterogeneous phase (impurity phase) caused by Bi and the third element was not detected in the state thereof immediately after baking. Many of such samples did not have good heat resistance. As a result of detailed studies, it has been clarified that, for enhancing the heat resistance of the composite oxide that comprises mainly Ce, Bi and a third element, addition of the above-mentioned R as the third element is extremely effective.

The composite oxide to which the invention is directed is favorably produced according a method of baking a precipitated product obtained in a wet process. For example, a water-soluble salt of Ce, a water-soluble salt of Bi, a water-soluble salt of R (e.g., Pr), and optionally further a water-soluble salt of Zr are reacted with a precipitating agent, then the resulting precipitate is dried to give a "precursor", and the precursor is heat-treated to produce a composite oxide.

Concretely, an alkali, serving as a precipitating agent, is added to and reacted with an aqueous solution of a water-soluble salt (e.g., nitrate) of Ce, a water-soluble salt (e.g., nitrate) of Bi, a water-soluble salt (e.g., nitrate) of R, and optionally further a water-soluble salt of Zr dissolved therein, and then the precipitated product is collected by filtration, washed and dried to give a precursor. The uppermost limit of the ion concentration of Ce, Bi and R in the liquid in which the precipitate is formed may be determined depending on the solubility of the salts. However, when the concentration in the liquid is too high, uniform reaction could not go on in stirring and the system may be ununiform, and the device load in stirring may be too large; and accordingly, too high concentration is not practicable.

For forming the precipitate, use of an alkali carbonate is recommended. As concretely exemplified, preferred is use of a mixture of a carbonic acid-based material such as carbonated water, carbon dioxide gas, sodium carbonate, potassium carbonate or sodium hydrogencarbonate, and aqueous ammonia or any of water-soluble ammonium salts as combined, or use of an ammonium carbonate compound having both the two functions, concretely ammonium carbonate or ammonium hydrogencarbonate. It is also possible to prepare a precipitate by previously adding urea to a salt solution, then heating the salt solution to decompose the urea to generate ammonia, and thereby making the salt solution alkaline. The pH of the liquid in which the precipitate is formed is preferably controlled to fall within a range of from 6 to 11. In the region where the pH is less than 6, Bi, Ce and R, or Bi, Ce, R and Zr may not co-precipitate, and the region is therefore unfavorable.

Also, a Ce compound, a Bi compound, an R compound, and optionally further a Zr compound that are hydrolyzable are prepared, these are added to water and hydrolyzed to form a mixed sol, and this may be coagulated and precipitated. The hydrolyzable compounds include, for example, alkoxides and β-keto acid salts of the corresponding metal elements.

If desired, the prepared precipitate is collected by filtration, washed with water and dried in vacuum or by aeration to give a precursor. On this occasion, for the purpose of enhancing the dewatering effect by drying, the precipitate may be directly dried as it is immediately after collected by filtration, or may be dried after granulated into a predetermined shape. Next, the precursor is, as it is powdery or granular, heat-treated (baked), for example, at 400 to 1000° C., preferably at 500 to 850° C. to thereby produce the intended composite oxide. Not specifically defined, the atmosphere in baking may be any one in which a composite oxide can be formed. For example, usable is an atmosphere of air, nitrogen, argon or their combination with water vapor.

In case where a platinum group element is incorporated in the composite oxide of the invention, for example, employable is a method of infiltrating an intended amount of a salt or complex of a platinum group element into a baked composite oxide followed by drying and further baking it.

Using the composite oxide of the invention as an exhaust gas purification catalyst, a filter for diesel exhaust gas purification may be constructed according to a conventional method. The composite oxide of the invention is mixed with a powder of $Al_2O_3$, $TiO_2$, $SiO_2$ or the like to constitute an exhaust gas purification catalyst; and using it, a filter for diesel exhaust gas purification may be constructed. In any case, the composite oxide of the invention is made to exist in the site to be contacted with PM trapped in the porous structure.

EXAMPLES

<<Production of Composite Oxide>>

Composite oxides of Examples and Comparative Examples were produced as follows.

Examples 1, 2

As a Ce source, cerium nitrate 6-hydrate ($Ce(NO_3)_3 \cdot 6H_2O$), and as a Bi source, bismuth nitrate 5-hydrate ($Bi(NO_3)_3 \cdot 5H_2O$) were prepared. On the other hand, as an R source, a powder of a rare earth oxide (Example 1: Pr oxide, Example 2: Tb oxide) was dissolved in concentrated nitric acid solution to prepare a nitric acid solution of R.

The nitrate and the nitric acid solution of R mentioned above were mixed in a blend ratio by mol of Ce/Bi/R=0.6/0.3/0.1, and water was added thereto so that the total of Ce, Bi and R in the mixed nitric acid solution could be 0.2 mol/L, thereby preparing a starting material solution. As a precipitating agent, an aqueous solution of ammonium carbonate was added to the solution with stirring. Next, this was kept stirred for 30 minutes to sufficiently promote the precipitation reaction. The formed precipitate was collected through filtration, washed with water, and dried at 125° C. for about 15 hours to give a dry powder. Thus obtained, the powder is referred to as a precursor. Next, the precursor was baked in an air atmosphere at 800° C. for 2 hours to give a composite oxide mainly comprising Ce, Bi and R (where R is Pr in Example 1, and Tb in Example 2).

Example 3

The same Ce source, Bi source and R source as in Example 1 were prepared; and further, as a Zr source, zirconium oxynitrate 2-hydrate ($ZrO(NO_3)_2 \cdot 2H_2O$) was prepared. These were mixed in a blend ratio by mol of Ce/Bi/R/Zr=0.7/0.1/0.1/0.1, and water was added thereto so that the total of Ce, Bi, R and Zr in the mixed nitric acid solution could be 0.2 mol/L, thereby preparing a starting material solution. Next, this was processed in the same manner and under the same condition as in Example 1 to produce a composite oxide mainly comprising Ce, Bi, Pr and Zr.

Examples 4 to 9

Composite oxides mainly comprising Ce, Bi and Pr were produced under the same condition as in Example 1, for which, however, the molar ratio of Ce, Bi and Pr was changed as in Table 2.

Comparative Example 1

Cerium nitrate 6-hydrate ($Ce(NO_3)_3 \cdot 6H_2O$) and bismuth nitrate 5-hydrate ($Bi(NO_3)_3 \cdot 5H_2O$) were weighed in a ratio by mol of Ce/Bi=0.7/0.3. These were dissolved in nitric acid solution, and water was added thereto so that the total of Ce and Bi in the mixed nitric acid solution could be 0.2 mol/L, thereby preparing a starting material solution. Next, this was processed in the same manner and under the same condition as in Example 1 to produce a composite oxide mainly comprising Ce and Bi.

Comparative Example 2

Cerium nitrate 6-hydrate ($Ce(NO_3)_3 \cdot 6H_2O$), bismuth nitrate 5-hydrate ($Bi(NO_3)_3 \cdot 5H_2O$) and iron nitrate 9-hydrate ($Fe(NO_3)_3 \cdot 9H_2O$) were weighed in a ratio by mol of Ce/Bi/Fe=0.6/0.3/0.1. These were dissolved in nitric acid solution, and water was added thereto so that the total of Ce, Bi and Fe in the mixed nitric acid solution could be 0.2 mol/L, thereby preparing a starting material solution. Next, this was processed in the same manner and under the same condition as in Example 1 to produce a composite oxide mainly comprising Ce, Bi and Fe.

Comparative Example 3

Cerium nitrate 6-hydrate ($Ce(NO_3)_3 \cdot 6H_2O$), bismuth nitrate 5-hydrate ($Bi(NO_3)_3 \cdot 5H_2O$) and zirconium oxynitrate 2-hydrate ($ZrO(NO_3)_2 \cdot 2H_2O$) were weighed in a ratio by mol of Ce/Bi/Zr=0.6/0.3/0.1. These were dissolved in nitric acid solution, and water was added thereto so that the total of Ce, Bi and Zr in the mixed nitric acid solution could be 0.2 mol/L, thereby preparing a starting material solution. Next, this was processed in the same manner and under the same condition as in Example 1 to produce a composite oxide mainly comprising Ce, Bi and Zr.

<<Production of Sample for Heat Resistance Evaluation>>

To evaluate the heat resistance of the obtained composite oxides, a part of each composite oxide was heat-treated (for heat resistance treatment) in air in an electric furnace at 800° C. for 100 hours.

<<Determination of BET Specific Surface Area>>

The samples before heat resistance treatment obtained in Examples and Comparative Examples (expressed as 800° C.×2 hrs) and the samples after the heat resistance treatment (expressed as 800° C.×100 hrs) were individually pulverized in an agate mortar to be a powder, and analyzed according to a BET method to determine the specific surface area of each sample. For this, used was Yuasa Ionics' 4-Sorb US.

<<Determination of PM Combustion Starting Temperature>>

The samples obtained in Examples and Comparative Examples and the samples after the heat resistance treatment were individually mixed with carbon black to prepare a mixed powder; this was partly sampled in a predetermined amount, and analyzed with TG/DTA to determine the carbon black combustion starting temperature of each sample. The found data indicate the PM combustion starting temperature of each sample. This is concretely as follows:

As a simulated PM, used was commercial carbon black (by Mitsubishi Chemical, having a mean particle size of 2.09 μm). A powder of the composite oxide sample and carbon black were weighted in a ratio by mass of 6/1, and mixed in an automatic mortar (Ishikawa Factory's AGA Model) for 20 minutes to prepare a mixed powder of carbon black and sample powder. 20 mg of the mixed powder was set in TG/DTA (Seiko instruments' TG/DTA 6300 Model), and heated from room temperature up to 700° C. in air at a heating speed of 10° C./min to thereby determine the weight loss of the powder (carbon black is fired to be carbon dioxide and is discharged out of the system, and therefore the weight of the heated sample tends to decrease from the initial weight thereof). FIG. 1 graphically shows a thermogravimetric curve (TG curve). On the TG curve, the temperature corresponding to the point at which the tangent line to the curve before the start of weight reduction meets the tangent line to the curve at a point at which the weight reduction profile (inclination) is the largest is taken as the PM combustion starting temperature of the analyzed sample.

From the difference between the PM combustion starting temperature of the sample after the heat resistance treatment (expressed as 800° C.×100 hrs) and the PM combustion starting temperature of the sample before the heat resistance treatment (expressed as 800° C.×2 hrs), Δt was computed.

<<Determination of X-Ray Diffraction Pattern>>

The samples before the heat resistance treatment obtained in Examples and the samples after the heat resistance treatment were analyzed for the X-ray diffraction pattern thereof, under the condition mentioned below.

| X-ray Diffractiometer: | Rigaku's RINT-2100 |
|---|---|
| Test Range: | 2θ = 20-70° |
| Scanning Speed: | 2.0°/min |
| Sampling Width: | 0.02° |
| Bulb: | Co bulb (with Co-Kα ray) |
| Bulb Voltage: | 40 kV |
| Bulb Current: | 30 mA |

<<Regarding Test Data>>

Of the composite oxides of Examples 1 to 3 and Comparative Examples 1 to 3, the molar ratio of the constitutive elements, the specific surface area and the PM combustion starting temperature are shown in Table 1.

TABLE 1

| Example No. | Constitutive Elements (ratio by mol) | | | BET Specific Surface Area ($m^2/g$) | | PM Combustion Stating Temperature (° C.) | | |
|---|---|---|---|---|---|---|---|---|
| | Ce | Bi | others | 800° C. × 2 h | 800° C. × 100 h | 800° C. × 2 h | 800° C. × 100 h | ΔT |
| Example 1 | 0.6 | 0.3 | Pr: 0.1 | 25.7 | 11.7 | 314.6 | 324.5 | 9.9 |
| Example 2 | 0.6 | 0.3 | Tb: 0.1 | 24.3 | 28.4 | 318.7 | 328.5 | 9.8 |
| Example 3 | 0.5 | 0.3 | Pr: 0.1 Zr: 0.1 | 33.4 | 20.3 | 319.2 | 321.4 | 2.2 |
| Comparative Example 1 | 0.7 | 0.3 | — | 26.1 | 6.2 | 327.0 | 345.0 | 18.0 |
| Comparative Example 2 | 0.6 | 0.3 | Fe: 0.1 | 17.2 | 1.9 | 337.0 | 381.4 | 44.4 |
| Comparative Example 3 | 0.6 | 0.3 | Zr: 0.1 | 23.1 | 10.3 | 335.0 | 349.8 | 14.8 |

Table 1 confirms that, when the Ce—Bi—R-based composite oxide of Examples 1 and 2 or the Ce—Bi—R—Zr-based composite oxide of Example 3 was used as a catalyst, then the PM combustion starting temperature before heat resistance treatment and after heat resistance treatment significantly lowered, as compared with the Ce—Bi-based composite oxide of Comparative Example 1, the Ce—Bi—Fe-based composite oxide of Comparative Example 2 and the Ce—Bi—Zr-based composite oxide of Comparative Example 3, all not containing R. Accordingly, the Ce—Bi—R-based and Ce—Bi—R—Zr-based composite oxides can function as an exhaust gas purification catalyst significantly contributing toward PM combustion temperature depression. Comparing. Example 1 (not containing Zr) and Example 3 (containing Zr) confirms that Zr is effective for increase in specific surface area and is especially effective for PM combustion starting temperature depression after heat resistance treatment and for ΔT reduction.

Of the composite oxides of Example 1 and Examples 4 to 9 mentioned above, the molar ratio of the constitutive elements, the specific surface area and the PM combustion starting temperature are shown in Table 2.

TABLE 2

| Example No. | Constitutive Elements (ratio by mol) | | | BET Specific Surface Area (m²/g) | | PM Combustion Stating Temperature (° C.) | | |
|---|---|---|---|---|---|---|---|---|
| | Ce | Bi | Pr | 800° C. × 2 h | 800° C. × 100 h | 800° C. × 2 h | 800° C. × 100 h | ΔT |
| Example 1 | 0.6 | 0.3 | 0.1 | 25.7 | 11.7 | 314.6 | 324.5 | 9.9 |
| Example 4 | 0.4 | 0.3 | 0.3 | 28.9 | 23.0 | 320.1 | 329.4 | 9.3 |
| Example 5 | 0.7 | 0.2 | 0.1 | 35.3 | 19.2 | 317.3 | 326.6 | 9.3 |
| Example 6 | 0.5 | 0.2 | 0.3 | 36.2 | 25.2 | 322.0 | 324.9 | 2.9 |
| Example 7 | 0.8 | 0.1 | 0.1 | 33.3 | 25.6 | 324.8 | 328.5 | 3.7 |
| Example 8 | 0.6 | 0.1 | 0.3 | 36.1 | 28.1 | 328.5 | 336.8 | 8.3 |
| Example 9 | 0.5 | 0.1 | 0.4 | 32.6 | 26.2 | 330.0 | 335.0 | 5.0 |

Table 2 confirms that the Ce—Bi—Pr-based composite oxides of Examples 1 and 4 to 9 having a composition defined by the above [a] are excellent in that the PM combustion temperature after heat resistance treatment is low and Δt is lower than 10° C., as compared with that of Comparative Example (not containing R) in Table 1. Regarding the Pr concentration, there occurs no specific problem in point of the catalyst capability even when the Ce atom is substituted with Pr to an equivalent degree or more.

Figure 2:
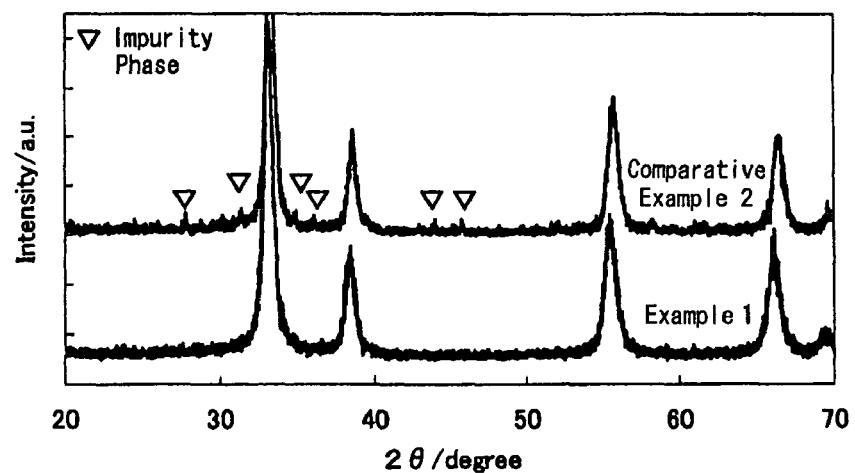
FIG. 2 shows X-ray diffraction patterns of the composite oxide samples obtained after heat resistance treatment in Example 1 and Comparative Example 2.

FIG. 2 shows X-ray diffraction patterns of the samples after heat resistance treatment of Example 1 and Comparative Example 2 (heated at 800° C. for 100 hours after baked in an air atmosphere at 800° C. for 2 hours), as analyzed under the condition mentioned in the above. The composite oxide of Example 1 gave a pattern having an X-ray diffraction peak that corresponds to a fluorite structure, before and after heat resistance treatment; and under the test condition, no impurity phase was detected. The same shall apply to all the other Examples. As opposed to this, no impurity phase was detected in the composite oxide of Comparative Example 2 before heat resistance treatment, but an impurity phase (Fe—Bi composite oxide phase) was formed after heat resistance treatment, as in FIG. 2. It is considered that the formed impurity phase would lower the catalytic activity of the composite oxide. Desirably, no impurity phase is formed through heat resistance treatment; however, formation of a minor impurity phase may be acceptable, not having any negative influence on the catalytic activity of the composite oxide.

Examples 10, 11

Next, a platinum group element was given to the composite oxide of Example 1 mentioned in the above. Its application method is as follows: In Example 10, 2.35 g of dinitrodiammine platinum nitrate solution having a Pt concentration of 8.49% by mass, but in Example 11, 3.8 g of palladium nitrate solution having a Pd concentration of 5.27% by mass was added to 20 g of the composite oxide obtained in Example 1, evaporated to dryness, and baked at 600° C. for 1 hour. Thus produced, the platinum group element-bearing composite oxide was analyzed for the specific surface area and the PM combustion starting temperature before and after heat resistance treatment, in the same manner as in Example 1. The results are shown in Table 3. The data of Example 1 are also shown in Table 3. The composite oxides of Examples 10 and 11 were analyzed through ICP. The Pt content in Example 10 was 1.0% by mass, and the Pd content in Example 10 was 1.0% by mass.

TABLE 3

| Example No. | Additional Element | BET Specific Surface Area (m²/g) | | PM Combustion Stating Temperature (° C.) | | |
|---|---|---|---|---|---|---|
| | | 800° C. × 2 h | 800° C. × 100 h | 800° C. × 2 h | 800° C. × 100 h | ΔT |
| Example 1 | — | 25.7 | 11.7 | 314.6 | 324.5 | 9.9 |
| Example 10 | Pt | 26.7 | 15.1 | 313.5 | 323.0 | 9.5 |
| Example 11 | Pd | 25.9 | 12.2 | 314.2 | 324.2 | 10.0 |

As known from Table 3, the platinum group element-added composite oxides of Examples 10 and 11 had a lowered PM combustion temperature before and after heat resistance treatment like in Example 1, and had a sufficiently lowered ΔT.

The invention claimed is:

1. An exhaust gas purification catalyst comprising the composite oxide and a platinum group element, wherein the composite oxide consists of Ce, Bi, R (where R is at least one lanthanoid except La and Ce) and oxygen, and satisfies $0<x\leqq0.4$ and $0<y<1.0$ when the molar ratio of Ce, Bi and R is represented as $(1-x-y)$, $x$, and $y$, respectively wherein $x+y<1$, and wherein $x+y<1.0$.

2. The composite oxide for exhaust gas purification catalysts as claimed in claim 1, wherein R contains one or two of Pr and Tb.

3. The composite oxide for exhaust gas purification catalysts as claimed in claim 1, wherein the composite oxide has an X-ray diffraction peak corresponding to that of a fluorite structure.

4. The exhaust gas purification catalyst as claimed in claim 1, wherein the exhaust gas purification catalyst is a particulate matter combustion catalyst.

* * * * *